United States Patent
Rutter

(12) 
(10) Patent No.: US 6,408,793 B1
(45) Date of Patent: Jun. 25, 2002

(54) FLEXIBLE AND REMOVABLY DETACHABLE TIE-OUT AND SYSTEM OF SAME

(75) Inventor: Stephen W. Rutter, Patagonia, AZ (US)

(73) Assignee: Khubli, LLC, Patagonia, AZ (US)

( * ) Notice: Subject to any disclaimer, the term of this patent is extended or adjusted under 35 U.S.C. 154(b) by 0 days.

(21) Appl. No.: 09/690,052

(22) Filed: Oct. 16, 2000

(51) Int. Cl.$^7$ ................................................. B60P 3/04
(52) U.S. Cl. ........................ 119/400; 119/703; 119/771
(58) Field of Search ...................... 119/786, 87, 88–91, 119/400, 700, 724, 738, 739, 740–59, 766, 769, 771, 783

(56) References Cited

U.S. PATENT DOCUMENTS

| | | | |
|---|---|---|---|
| 67,744 A | * 8/1867 | Fitzhugh | 119/789 |
| 86,587 A | * 2/1869 | Race | 24/129 R |
| 191,431 A | * 7/1877 | House | 119/778 |
| 213,084 A | * 3/1879 | Andrews | 119/791 |
| 429,111 A | * 6/1890 | Bailey | 119/786 |
| 498,351 A | * 5/1893 | Kasper | 119/789 |
| 530,487 A | * 12/1894 | Larsen | 119/778 |
| 606,922 A | * 7/1898 | Gates | 119/783 |
| 916,816 A | * 3/1909 | Williams | 119/778 |
| 963,310 A | * 7/1910 | McCrary | 119/777 |
| 1,167,793 A | * 1/1916 | Calhoon | 119/778 |
| 1,730,176 A | * 10/1929 | Thrasher et al. | 119/780 |
| 2,259,929 A | * 10/1941 | Evans | 119/783 |
| 3,003,466 A | * 10/1961 | Matarazzo | 119/771 |
| 3,454,275 A | * 7/1969 | Pontone | 473/429 |
| 3,648,664 A | * 3/1972 | Nunley | 119/785 |
| 4,134,364 A | * 1/1979 | Boncela | 119/703 |
| 4,159,142 A | * 6/1979 | Larson | 296/24.2 |
| 4,170,962 A | * 10/1979 | Limbaugh | 119/795 |
| D269,556 S | * 6/1983 | Studley et al. | D30/44 |
| 4,509,462 A | * 4/1985 | Pickett | 119/780 |
| 4,854,269 A | * 8/1989 | Arntzen | 119/703 |
| 4,947,801 A | * 8/1990 | Glass | 119/771 |
| 5,215,037 A | * 6/1993 | Allred | 119/771 |
| 5,375,561 A | * 12/1994 | Gundersen | 119/771 |
| 5,526,774 A | * 6/1996 | Swindal, Jr. et al. | 119/787 |
| 5,632,233 A | * 5/1997 | Kovach | 119/771 |
| 5,775,264 A | * 7/1998 | Dixon et al. | 119/771 |
| 6,142,103 A | * 11/2000 | Meyers et al. | 119/771 |
| 6,247,428 B1 | * 6/2001 | Mireles | 119/771 |
| 6,253,713 B1 | * 7/2001 | Giedeman et al. | 119/771 |
| 6,308,662 B1 | * 10/2001 | Furman | 119/772 |

* cited by examiner

Primary Examiner—Charles T. Jordan
Assistant Examiner—Stephen A Holzen
(74) Attorney, Agent, or Firm—Schmeiser, Olsen & Watts

(57) ABSTRACT

A flexible and removably detachable tie-out and tie-out system are provided. The tie-out includes a rigid portion removably coupled to a flexible portion. The flexible portion allows total universal motion of the tie-out and absorbs the pulls and tugs of an animal, while preventing damage to a trailer, the tie-out, and the animal. The tie-out system includes a base. Secured to the base and set out by a spacer is a receiver that is adapted to receive a connector. The connector couples the receiver to the tie-out. The tie-out system may be mounted easily for set-up on horse trailers or other structures. The connector and tie-out can be left attached or removed from the trailer while traveling. Furthermore, by having additional bases and receivers mounted where convenient, a detached connector and tie-out can be moved to multiple sites on the trailer or to a building or other structure as the need arises.

17 Claims, 3 Drawing Sheets

FLEXIBLE AND REMOVABLY DETACHABLE TIE-OUT AND SYSTEM OF SAME

BACKGROUND OF THE INVENTION

1. Technical Field

This invention relates to the field of animal restraints. More specifically, the invention relates to a flexible and removably detachable tie-out and system of same.

2. Background Art

Generally, animal tie-outs, such as for a horse, have previously been provided. Some of these tie-outs have been attached to trailers. However, these tie-outs have certain drawbacks. These tie-outs are rigid and fixed restraints. Therefore, when an attached animal pulls against these rigid and fixed restraints, the tie-outs are subject to bending and breaking. The likelihood of the tie-out breaking poses a danger. Specifically, if the tie-out breaks, the trailer, the tie-out, the animal, and a rider, if near by, may be damaged or injured. Furthermore, the rigid tie-outs cannot be used on all trailers due to obstructing trailer doors, windows, awning structures, and rain gutters. Even if the tie-outs can be mounted to trailers or other structures, the rigid tie-outs are permanently attached. Thus, for example, the tie-outs cannot be removed from trailers while traveling, or detached and transferred to another trailer, building, or structure.

SUMMARY OF THE INVENTION

Accordingly, what is needed is tie-out system that overcomes the bending/breaking and trailer incompatibility drawbacks of previous, structurally rigid tie-outs through a flexible and removably detachable tie-out and tie-out system. The invention solves these problems through a flexible and removably detachable tie-out and system of same. The tie-out includes a rigid portion removably coupled to a flexible portion. The tie-out system includes a base. Coupled to the base is a receiver that is adapted to receive a connector. The connector couples the receiver to the tie-out.

One advantage of this invention is that the flexible portion absorbs the pulls and tugs of a horse or other animal. Furthermore, the damping ability of the flexible portion prevents damage to a trailer, the tie-out, and the animal. Moreover, the flexible portion allows total universal motion of the tie-out.

Another advantage of the invention is that it can be mounted easily for set-up. Furthermore, if the invention is trailer-mounted, it can be left attached to the trailer while traveling, or removed from the trailer and stored separately while traveling. Moreover, the invention's detachability allows it to be used on virtually any trailer, building, or structure.

The foregoing and other features and advantages of the invention will be apparent from the following more particular description of the preferred embodiment of the invention, as illustrated in the accompanying drawings.

BRIEF DESCRIPTION OF THE DRAWINGS

The preferred embodiment of the invention will hereinafter be described in conjunction with the appended drawings, where like designations denote like elements, and.

DETAILED DESCRIPTION OF THE PREFERRED EMBODIMENT

Figure 1:
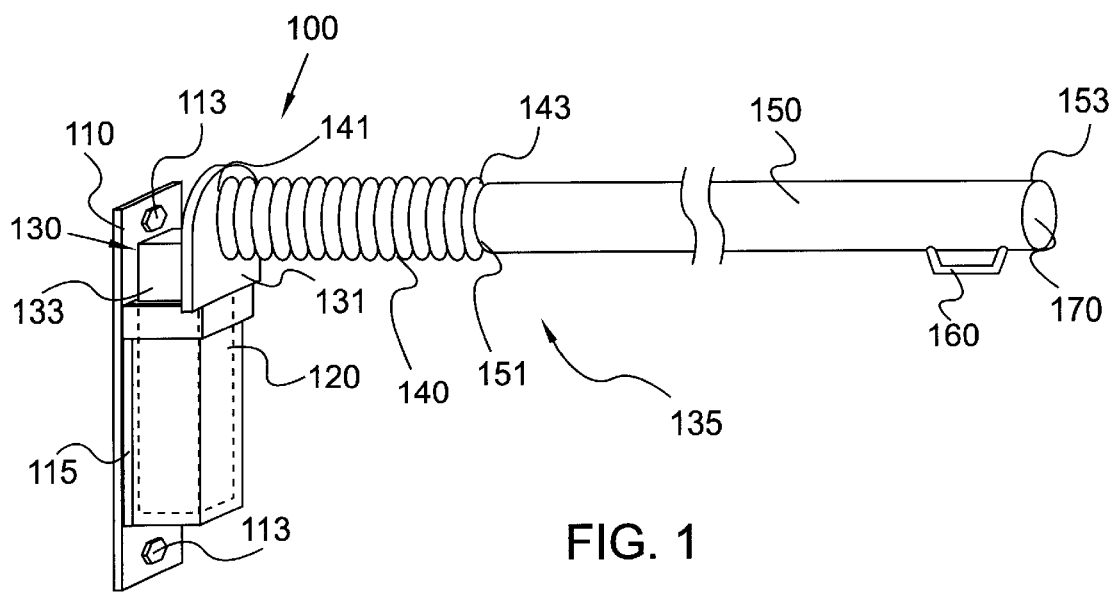
FIG. 1 is a three dimensional side view of the preferred tie-out and tie-out system of the invention.
Figure 2:
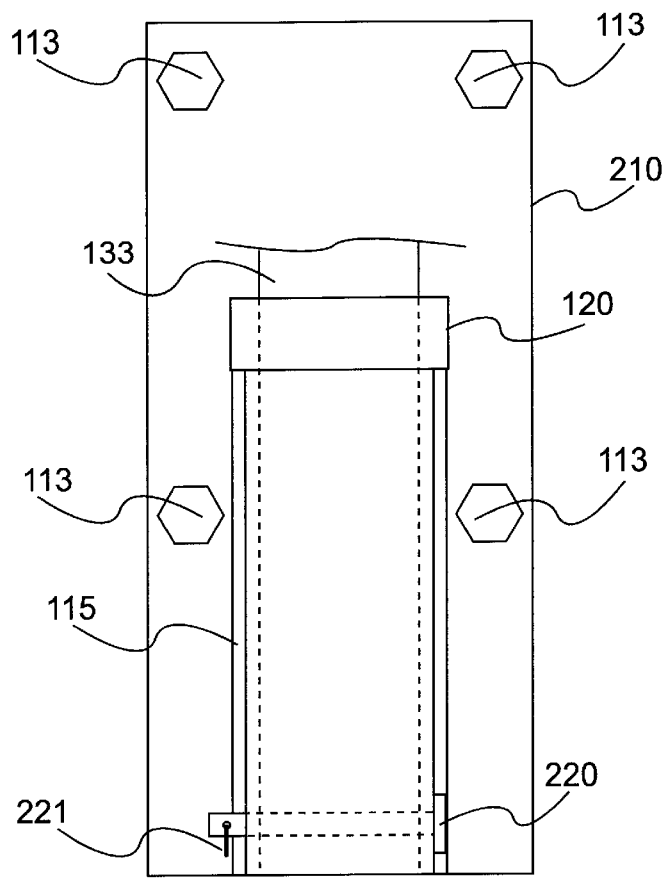
FIG. 2 is a front plan view of various components of an alternate tie-out system of the invention.
Figure 3:
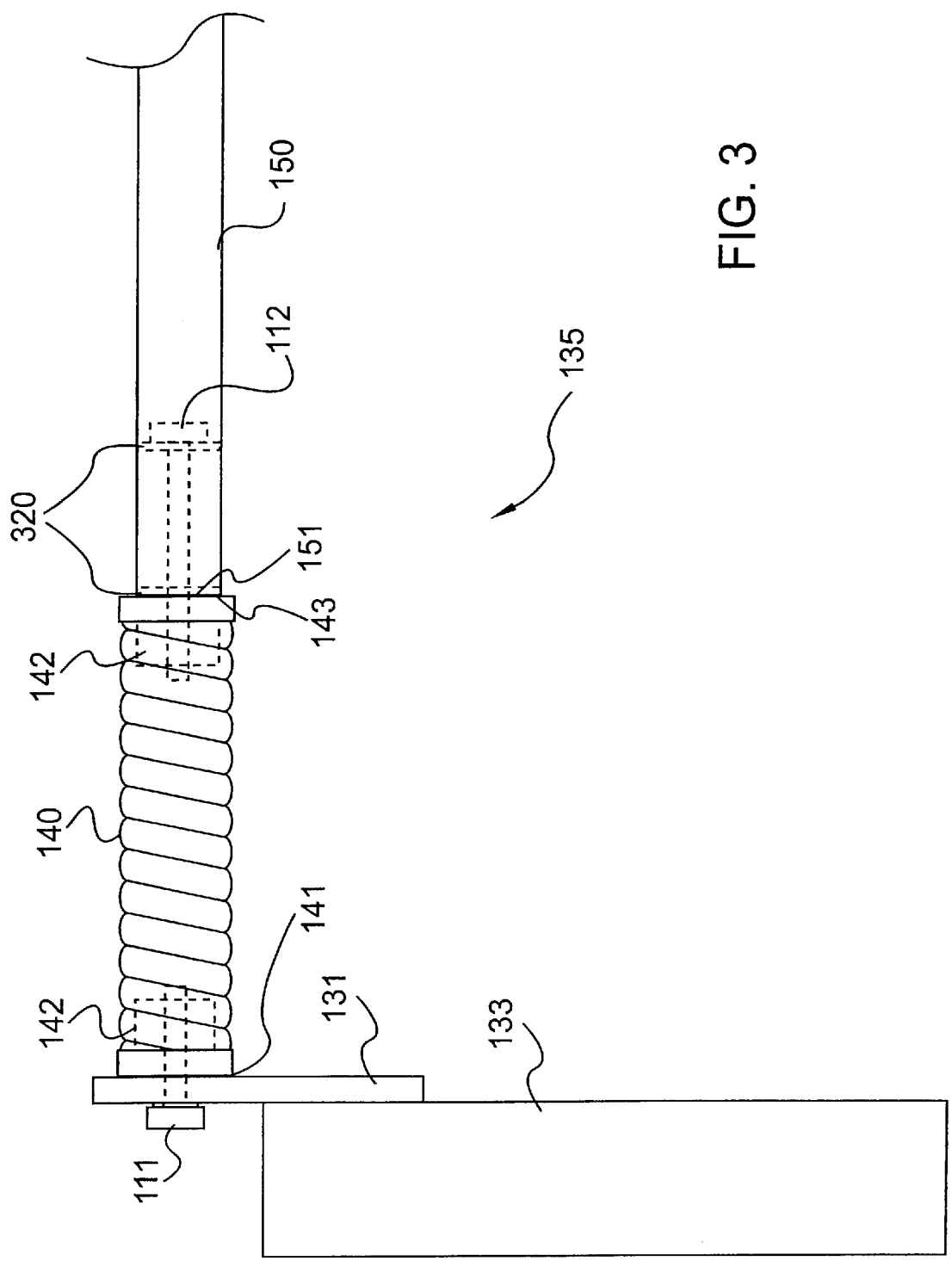
FIG. 3 is a side view of various components of the preferred tie-out system of the invention.

Referring generally to FIGS. 1–3, tie-out 135 includes a rigid portion 150 removably coupled to a flexible portion 140. Tie-out system 100 includes a base 110. Coupled to and set out from base 110 is a receiver 120 that is adapted to receive a connector 130. Connector 130 is adapted to removably couple receiver 120 to tie-out 135. Rigid portion 150 of tie-out 135 includes a first end 151 and a second end 153, and flexible portion 140 of tie-out 135 includes a first end 141 and a second end 143. First end 141 of flexible portion 140 is coupled to face plate 131 of connector 130 and second end 143 of flexible portion 140 is coupled to first end 151 of rigid portion 150.

Figure 4:
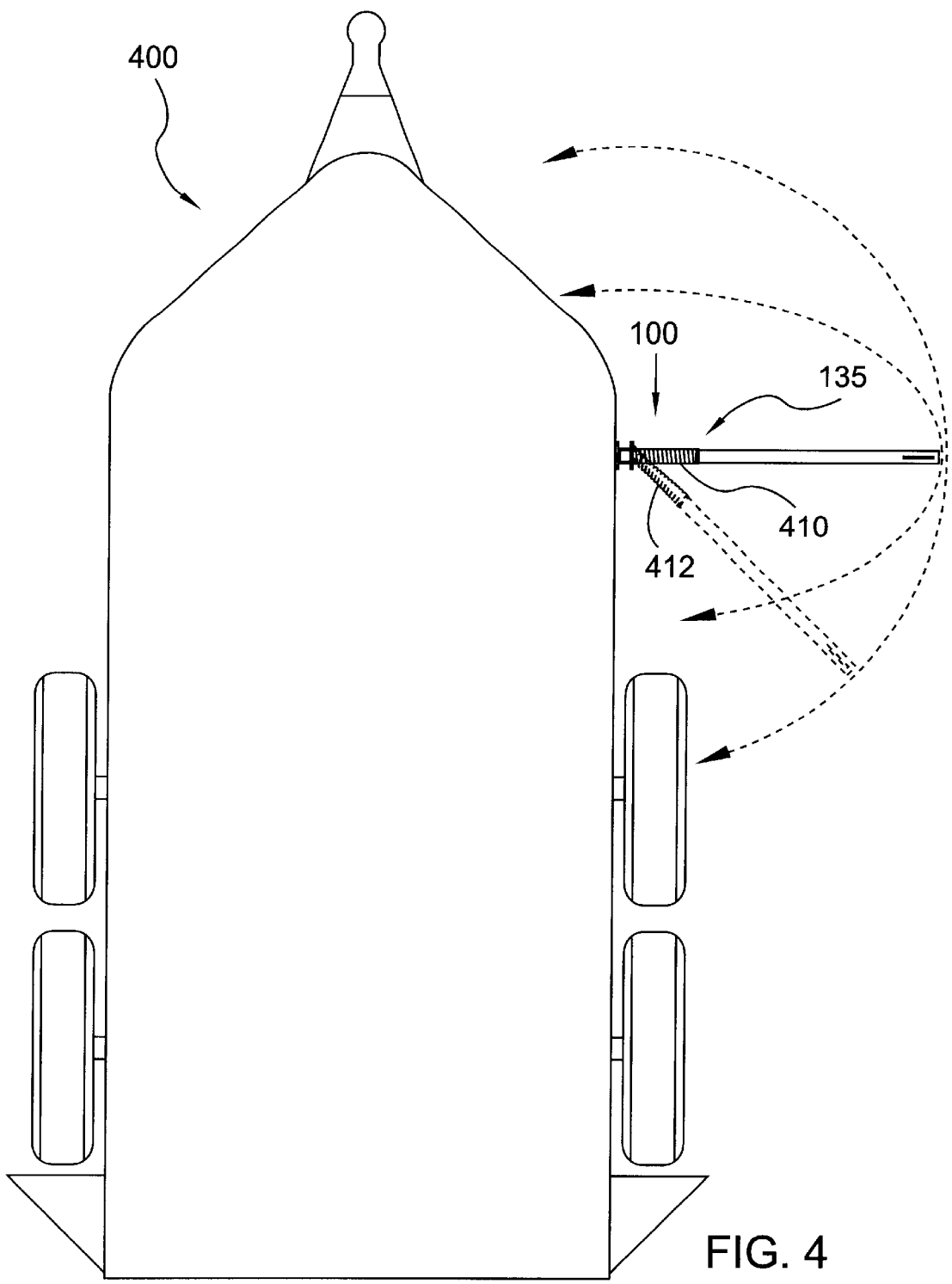
FIG. 4 is a top plan view of the preferred tie-out and tie-out system of the invention in conjunction with a trailer.

Referring to FIGS. 1, 3, and 4 and describing tie-out 135 in greater detail, tie-out 135 includes flexible portion 140 and rigid portion 150. As depicted in FIG. 4, flexible portion 140 has a quiescent state 410 and a flexed state 412, such that flexible portion 140 is preferably able to flex and bend to at least 100 degrees axially, but strong and resilient enough to return to its previous position. Flexible portion 140 preferably is approximately 9" long with approximately a 2 ⅝" outside diameter, but could have various lengths and have various outside diameters depending upon the amount of applied pressure it will be subject to, among other variables. Furthermore, flexible portion 140 can be assorted shapes as well.

Rigid portion 150 preferably is approximately 38" long with approximately a 1 ⅞" outside diameter, but could be of varied lengths according to particular situations and needs. Similarly, rigid portion 150 could be of various outside diameters depending upon the materials used and the strength required. Tie loop 160 preferably is coupled to the second end of rigid portion 150. Tie loop 160 preferably is a bale of approximately ⁵⁄₁₆" to ½" diameter curved rod that defines approximately a 2 ¼" opening at second end 153 of rigid portion 150, but could be of various diameters and could define a variety of opening sizes. Furthermore, tie loop 160 could include a series of tie loops along second end 153 of rigid portion 150 so that attachment of a tie, as hereinafter described, can be located depending upon the animal and the amount of pressure the animal will exert on flexible portion 140. A cap 170 could also be coupled to second end 153 of rigid portion 150, and cap 170 could incorporate tie loop 160.

Referring specifically to FIG. 3, flexible portion 140 is removably coupled to rigid portion 150 to form tie-out 135. Preferably, rigid portion 150 is removably coupled to flexible portion 140 by at least one threaded bolt 112 coupled to first end 151 of rigid portion 150 in removable threadable engagement with at least one flexible portion insert 142 adapted to receive threaded bolt 112. Specifically, threaded bolt 112 extends through at least one insert 320. Insert 320 is secured within first end 151 of rigid portion 150 so that only bolt 112 threads protrude. Insert 320 preferably is multiple inserts, such as two washers, one washer coupled to bolt 112 just under its head and one washer coupled to bolt 112 at the base of its threaded portion. Such washers would be sized to fit an inside diameter of rigid portion 150. Similarly, flexible portion 140 preferably includes insert 142 that is coupled to second end 143 of flexible portion 140 and is adapted to receive the protruding portion of bolt 112 in removable threadable engagement.

Referring to FIGS. 1 and 3 and describing tie-out system 100 in greater detail, tie-out system 100 preferably includes base 110, receiver 120, connector 130, and tie-out 135 as previously described. Tie-out system 100 is preferably coupled to a trailer, but could be removably coupled to any device, object, product, building, structure, or the like suitable for use in retaining an animal such as a horse.

Base 110 is preferably permanently coupled to a trailer or any other structure, but could be adapted to be removably coupled. Preferably, base 110 is coupled to a trailer or any other structure by at least two bolts 113. Preferably, base 110 is approximately 2" in width, approximately 12" in length, and approximately ¼" in depth, but could be a variety of widths, lengths, or depths.

Receiver 120 is configured to removably receive connector 130. Receiver 120 preferably has a 1 ¼" square opening, though the opening could be various sizes and/or shapes depending upon the shape and size of connector 130. Receiver 120 is coupled to and set out from base 110. Preferably, spacer 115 is coupled to base 110 to set out receiver 120. Spacer 115 is preferably approximately ¼" to ½" in width. Spacer 115 allows clearance for receiver 120 to removably receive connector 130 without interfering with, for example, rain gutters on a trailer or heads of bolts 113 of base 110.

Connector 130 is adapted to removably couple receiver 120 to tie-out 135. Preferably, connector 130 includes bar 133 and face plate 131. Bar 133 preferably is 1 ¼" square steel bar of any length suitable for removable slidable engagement with receiver 120, but could be any shape depending upon the shape of receiver 120. Face plate 131 can be any size, shape, or the like suitable for allowing connector portion 130 to removably couple with tie-out 135. As shown in FIG. 3, tie-out 135 is removably coupled at a 90 degree angle to connector 130, though tie-out 135 could be removably coupled at other angles. Preferably, connector 130 is removably coupled to flexible portion 140 by a second bolt 111 extending through face plate 131 of connector 130. Second bolt 111 threadably engages insert 142 coupled to first end 141 of flexible portion 140 to secure tie-out 135 to connector 130. Insert 142 is adapted to receive threaded bolt 111 in removable threadable engagement.

FIG. 2 depicts certain components of an alternative embodiment of tie-out system 100. The principal differences between the tie-out system in FIGS. 1 and 3 and the tie-out system that comprises the components in FIG. 2 is securing pin 220. Securing pin 220 secures bar 133 of connector 130 within receiver 120. Both connector 130 and receiver 120 include apertures that extend through both and align when bar 133 of connector 130 is within receiver 120. The aligning apertures could be ½" diameter apertures. The aligning apertures are adapted to removably slidably receive securing pin 220, which would be slightly less than ½" in diameter. Once securing pin 220 is received through the aligning apertures, cotter pin 221 can be used to retain securing pin 220 in place.

Additionally, FIG. 2 depicts base 210, an alternative embodiment of base 110. Base 210 preferably is wider than base 110, such as, for example, 4" in width. Furthermore, base 210 preferably includes four bolts 113 for removably mounting tie-out system 100.

The components of tie-out system 100 may be made from any of many different types of materials. Preferably, though, base 110, spacer 115, receiver 120, connector 130, rigid portion 150, tie loop 160, and flexible portion 140 are made out of a metal, preferably steel. Preferably, base 110 is a steel plate, receiver 120 is a hitch receiver, and connector 130 is a steel bar hitch. Rigid portion 150 may be a 13 gauge galvanized steel pipe, tie loop 160 may be a steel rod, and preferably flexible portion 140 is an oil tempered hardened steel expansion spring. Nevertheless, flexible portion 140 might be made from other materials that are able to flex and bend to at least 100 degrees axially, but strong and resilient enough to return to their previous positions.

The components defining tie-out system 100 can be manufactured separately and then assembled together. Base 110, spacer 115, receiver 120, connector 130, rigid portion 150, and flexible portion 140 are either manufactured, such as by milling, casting, or the like, or purchased already manufactured. The components defining tie-out system 100 can then be assembled together. Base 110 can be coupled to receiver 120 with spacer 115 separating them. This coupling might be a weld. Tie loop 160 can be coupled to second end 153 of rigid portion 150. This coupling might be a weld, though bolts could couple tie loop 160 to second end 153 of rigid portion 150. Inserts 142 can be coupled to first end 141 and second end 143 of flexible portion 140 respectively. For example, if flexible portion 140 is a spring as described previously, inserts 142 are preferably cast or machined to match the inside coils of the spring. Bolt 112 and insert 320 can be coupled together and then the combination of bolt 112 and insert 320 can be coupled to first end 151 of rigid portion 150. First end 151 of rigid portion 150 can be coupled to second end 143 of flexible portion 140, and then first end 141 of flexible portion 140 can be coupled to face plate 131 of connector 130. Other possible steps are sand blasting or polishing the components and powder coating tie-out system 100 to a desired color (preferably to match the color of the trailer). Alternatively, only certain components of tie-out system 100, such as base 110, spacer 115, and receiver 120, may be coated to a desired color.

For a preferred use of tie-out system 100, reference is made to FIG. 4. In FIG. 4, tie-out system 100 is shown in conjunction with a generic trailer 400 of any of a number For a preferred use of tie-out system 100, reference is made to FIG. 4. In FIG. 4, tie-out system 100 is shown in conjunction with a generic trailer 400 of any of a number of well known types. Preferably, base 110 is permanently coupled to trailer 400 by utilizing at least two bolts 113. Receiver 120 is coupled to and set out from base 110. Bar 133 of connector 130 is removably located within receiver 120. Rigid portion 150 and flexible portion 140 are removably coupled together to form tie-out 135, and tie-out 135 is removably coupled to face plate 131 of connector 130. Connector's 130 detachability from receiver 120 allows tie-out 135 to be used on any other location on trailer 400, another trailer, or another structure that has a base 110 and receiver 120 attached. Thus, additional bases 110 and receivers 120 can be mounted at other convenient locations or structures to receive a detached connector 130 and tie-out 135 as the need arises. Additionally, tie-out system 100 can be left attached to trailer 400 while traveling, or removed from trailer 400 and stored separately while traveling.

Once tie-out system 100 is mounted to trailer 400, a horse or other animal is attached to tie-out system 100 by coupling a tie attached to the animal to rigid portion 150 with tie loop 160 attaching the tie in position. The tie could be a rope, bungee cord, strap, or the like. Additionally, the tie could be removably coupled to rigid portion 150 by such mechanisms as a quick release, VELCRO, or the like.

After the animal is attached to tie-out system 100 and referring to FIG. 4, the application of a predetermined amount of pressure exerted by the animal on flexible portion 140 moves flexible portion 140 from quiescent state 410 to flexed state 412. However, flexible portion 140 returns to quiescent state 410 as the amount of pressure exerted by the animal lessens to an amount below the predetermined amount of pressure. Because of the resiliency of flexible portion 140, tie-out 135 preferably is able to flex and bend to at least 100 degrees axially and able to return to its previous position. Thus, flexible portion 140 absorbs the pulls and tugs of the animal and provides resistance, thereby eventually causing the animal to tire and to stop pulling. Furthermore, as the animal pulls and tugs, the damping ability of flexible portion 140 prevents damage to trailer 400, tie-out system 100, and the animal. Moreover, flexible portion 140 can allow for total universal motion of tie-out 135 as the animal pulls while effectively restraining the animal.

While the invention has been particularly shown and described with reference to a preferred embodiment thereof, together with numerous characteristics and advantages of the invention and details of the structure and function of the invention, it will be understood by those skilled in the art that various changes in form and details, and especially in the matters of shape, size and arrangement of parts, may be made therein to the full extent indicated by the broad general meaning of the terms in which the appended claims are expressed, and without departing from the spirit and scope of the invention.

What is claimed is:

1. A tie-out adapted to be removably coupled to a structure, the tie-out comprising:

a pipe removably coupled to a flexible portion and extending outwardly therefrom, wherein the pipe is approximately 38" long with approximately a 1 ⅞" outside diameter; and the flexible portion having a quiescent state and a flexed state, whereby the application of a predetermined amount of pressure on the flexible portion can move the flexible portion from its quiescent state to its flexed state, the flexible portion adapted to return to its quiescent state as the amount of pressure lessens to an amount below the predetermined amount of pressure, wherein the flexible portion is approximately 9" long with approximately a 2 ⅝" outside diameter.

2. The tie-out of claim 1, wherein a tie loop is coupled to a second end of the pipe.

3. The tie-out of claim 2, wherein the tie loop comprises a bale of approximately 5/16" to ½" diameter curved rod that defines approximately a 2 ¼" opening at the second end of the pipe.

4. The tie-out of claim 2, wherein the tie loop comprises a series of tie loops along the second end of the pipe.

5. The tie-out of claim 1, wherein the flexible portion is able to flex and bend to at least 100 degrees axially, but strong and resilient enough to return to its previous position.

6. The tie-out of claim 1, wherein the flexible portion comprises a spring.

7. A tie-out system comprising:
   a base;
   a receiver adapted to be coupled to the base and adapted to removably receive a connector;
   the connector adapted to removably couple the receiver to a tie-out; and the tie-out comprising:
      a pipe with a first end and a second end; and
      a spring with a first end and a second end, the first end removably coupled to a first end of the connector, and the second end removably coupled to the first end of the pipe by at least one threaded bolt coupled to the first end of the pipe in removable threadable engagement with at least one spring insert adapted to receive the threaded bolt.

8. The tie-out system of claim 7 further comprising a trailer, and wherein the base is coupled to the trailer.

9. The tie-out system of claim 7, wherein the base comprises a plate.

10. The tie-out system of claim 7, wherein both the connector and the receiver include aligning apertures adapted to removably receive a securing pin to secure the connector within the receiver.

11. The tie-out system of claim 7, wherein the receiver comprises a hitch receiver and wherein the connector comprises a hitch.

12. The tie-out system of claim 7, wherein a tie loop is coupled to the second end of the pipe.

13. A tie-out system for use with a trailer, the tie-out system comprising:
   a plate coupled to the trailer;
   a hitch receiver adapted to be coupled to the plate and adapted to removably receive a hitch;
   the hitch adapted to removably couple the hitch receiver to a tie-out; and
   the tie-out comprising:
      a pipe with a first end and a second end, wherein a tie loop is coupled to the second end; and
      a spring with a first end and a second end, the first end removably coupled to a first end of the hitch, and the second end removably coupled to the first end of the pipe by a threaded bolt coupled to a first end of the pipe in removable threadable engagement with a spring insert adapted to receive the threaded bolt.

14. The tie-out system of claim 13, wherein the plate is coupled to the trailer by at least two bolts.

15. The tie-out system of claim 13, wherein both the hitch and the hitch receiver include aligning apertures adapted to removably receive a securing pin to secure the hitch within the hitch receiver.

16. The tie-out system of claim 13, wherein the tie loop comprises a bale of approximately 5/16" to ½" diameter curved rod that defines approximately a 2 ¼" opening at the second end of the pipe.

17. The tie-out system of claim 13, wherein the pipe is approximately 38" long with approximately a 1 ⅞" outside diameter, and wherein the spring is approximately 9" long with approximately a 2 ⅝" outside diameter.

\* \* \* \* \*